UNITED STATES PATENT OFFICE

2,605,240

SILVER-BERYLLIUM OXIDE CATALYST AND METHOD FOR MAKING SAME

George W. Sears, Jr., and Wallace W. Thompson, Wilmington, Del., assignors to E. I. du Pont de Nemours & Company, Wilmington, Del., a corporation of Delaware No Drawing. Application November 12, 1949, Serial No. 126,917

3 Claims. (Cl. 252—475)

The invention relates to catalyst compositions. More particularly it relates to catalyst compositions adapted to catalyze vapor-phase oxidation of ethylene to ethylene oxide which contain metallic silver as an essential catalytic agent in admixture with a lesser amount of beryllium oxide, the metallic silver-beryllium oxide mixture being obtained by a modified coprecipitation procedure.

A coassigned copending Sears application Serial No. 100,981 filed June 23, 1949, teaches that the activity of silver-containing catalyst compositions for ethylene oxidation is greatly increased by associating beryllium oxide with metallic silver using a coprecipitation procedure. Silver catalysts so prepared are claimed in the application. The silver:beryllium weight ratios employed were set out broadly as 10:1 to 5000:1, more preferably as 100:1 to 1500:1.

The activity of the silver:beryllium oxide catalyst compositions of the earlier application increases as the beryllium content is increased so that catalytic materials obtained by the coprecipitation procedure, containing silver:beryllium weight ratios of say 5:1 to 150:1, are considerably more active catalysts for ethylene oxidation than are those containing larger amounts of silver in the coprecipitate.

Unfortunately, prior to the present invention, the use of silver-beryllium oxide coprecipitate mixtures high in beryllium oxide (i. e. Ag:Be=5:1 to 150:1) has not been entirely satisfactory in the fluid-flow processes for the oxidation of ethylene to ethylene oxide. This is because such catalytic materials exhibit relatively little cohesion or adhesion. Their exceptional activity is rapidly lost in fluid-flow operations because the silver-beryllium oxide coprecipitate mixture disintegrates and the effective catalytic properties of the mixture are destroyed.

We have now discovered a method for modifying the high beryllium oxide-containing catalytic materials of the previous invention to obtain a catalyst which retains the high activity of those catalytic mixtures and is at the same time resistant to disintegration, thus having long catalyst life.

The catalyst compositions of the present invention contain as an active catalytic material a silver-beryllium oxide mixture obtained as follows: A reducible oxygen-containing compound of silver and a corresponding compound of beryllium are coprecipitated in a silver:beryllium weight ratio of 5:1 to 150:1 from a solution of a silver compound and a beryllium compound. The coprecipitate is intimately mixed with a separately prepared reducible oxygen-containing compound of silver. In the mixing, the separately prepared silver compound is added in amount corresponding to at least 25 parts by weight of silver for each part by weight of beryllium in the coprecipitate; and there is the additional limitation that the separately prepared silver compound be added in amount sufficient to give a resulting mixture in which the silver: beryllium weight ratio is in the range of 100:1 to 500:1. The intimate mixture is reduced to a mixture of silver and beryllium oxide; then the reduced mixture is heated at a temperature of 350 to 600° C. for 3 to 10 hours.

The term "catalyst composition" is used herein to refer to the total solid mixture with which gaseous reactants are contacted to effect the catalytic reaction. Thus the term includes not only the silver-beryllium oxide active catalytic material but also all other materials in the solid mixture such as carriers, supports, diluents, promoters and conditioning agents.

The expression "reducible oxygen-containing compound of silver" refers to inorganic or organic silver compounds from which metallic silver may be obtained by reducing either thermally or chemically. Such compounds include silver oxide, silver carbonate, silver nitrate and such organic compounds as the silver salts of carboxylic acids such as formic, acetic, propionic, butyric, isobutyric, valeric, oxalic, malic, malonic, lactic, and maleic acids. The term "corresponding compound of beryllium" refers to similar beryllium compounds such as beryllium hydroxide, beryllium carbonate, beryllium nitrate, and organic beryllium compounds such as the formate, acetate, propionate, oxalate and maleate.

In preparing the silver-beryllium oxide active catalytic materials, a solution containing both a silver salt and a beryllium salt is first prepared as, for example, by dissolving silver nitrate and beryllium nitrate in water. The silver and beryllium are coprecipitated from the solution as their corresponding water-insoluble oxides or hydroxides, carbonates or carboxylic acid salts by addition of an appropriate reagent. Such coprecipitate may also be obtained by first preparing an alkali metal beryllate, as by reacting beryllium nitrate with excess alkali metal hydroxide, and then adding the alkali metal beryllate to a silver nitrate solution to coprecipitate the metals as their oxides or hydroxides.

Beryllium is present in the coprecipitate in a minor but relatively high amount. The silver:beryllium weight ratio in the coprecipitate is from 5:1 to 150:1; and in preparing the coprecipitate, the relative amounts of silver and beryllium compounds employed are adjusted accordingly.

Next a separately prepared reducible oxygen-containing compound of silver is intimately mixed with the coprecipitate. The separately prepared reducible oxygen-containing compound of silver may be silver oxide, silver carbonate or any of the silver compounds referred to previously. Preferably it is silver oxide, hydroxide or carbonate. It may be the same or different from the silver compound which has been precipitated with the beryllium compound.

The separately prepared reducible silver compound is mixed with the coprecipitate. There are two limitations on the amount of separately prepared silver compound used in this mixing step. First, the amount added must as a minimum correspond to at least 25 parts by weight of silver for each part by weight of beryllium in the coprecipitate. Secondly, the amount added must be sufficient to give a resulting mixture having a silver : beryllium weight ratio which is in the range of 100:1 to 500:1. Thus, for example, if the coprecipitate has a Ag:Be weight ratio of 150:1, then the separately prepared silver compound is added in amount corresponding to at least 25 parts by weight of silver for each part of beryllium in the coprecipitate, thus giving a resulting intimate mixture having a minimum Ag:Be weight ratio of 175:1. However, the separately prepared silver compound should not be added to the coprecipitate in an amount which will cause the resulting mixture to have an Ag:Be weight ratio in excess of 500:1. On the other hand, if the coprecipitate used has an Ag:Be weight ratio of 5:1 then the separately prepared silver compound is added in amount corresponding to at least 95 parts by weight of silver for each part of beryllium in the coprecipitate but not more than 495 parts by weight of silver for each part by weight of beryllium in the coprecipitate in order to give a resulting mixture in which the Ag:Be ratio was in the range of 100:1 to 500:1.

The intimate mixture of separately prepared reducible silver compound with the coprecipitate may be attained in any suitable manner. Thus the two ingredients may be vigorously agitated in the presence of sufficient liquid to form a paste. Preferably a freshly precipitated reducible oxygen-containing compound of silver is thoroughly mixed with a freshly prepared coprecipitate of reducible oxygen-containing compounds of silver and beryllium in the presence of sufficient water to give a paste or heavy suspension of the solids.

The intimate mixture of the coprecipitate and the separately prepared reducible silver compound is then reduced, according to methods heretofore known in the art for reducing silver compounds to give metallic silver catalysts, as by heating or chemically by treating with reducing gases such as ethylene, hydrogen or carbon monoxide to give a metallic silver-beryllium oxide mixture. Prior to this step, the mixture may be admixed with a suitable support or carrier.

Following the reduction step, the silver-beryllium oxide mixture is then heated to effect a partial sintering of the mixture. This is done by heating the mass at 350 to 600° C. for a period of 3 to 10 hours. The use of temperatures in the upper part of the range or the use of longer heating times give a physically stronger but less active catalytic mass. Preferably the silver-beryllium oxide mixture is heated at 400 to 500° C. for 4 to 5 hours. The heating is suitably carried out in air.

In addition to the presence of silver and beryllium oxide as essential catalytic agents, the compositions of the invention may also include small quantities of material capable of acting as promoters. Suitable promoters include metals such as copper, aluminum, manganese, cobalt, iron, magnesium, gold, thorium, nickel, cadmium, cerium and zinc. These promoters may be used singly or in combination and may be incorporated with the silver-beryllium oxide catalyst in any suitable manner such as by mechanical mixture or coprecipitation.

While the silver-beryllium catalytic mixtures of the invention may be advantageously employed for some purposes without resorting to the use of a support or carrier, it is preferred, particularly for use in fluid-flow processes, that the catalytic mixtures be deposited upon a divided granular solid support or carrier. There may be employed any of the various materials suggested in the art as supports, carriers, or diluents such as firebrick, alumina, corundum, alundum, pumice, silica gel, calcined diatomaceous earth, zeolites or other aluminum silicates such as analcite, natrolite and nephelite.

The metallic silver-beryllium oxide containing catalytic mixture may be applied to the carrier or support and made adherent thereto or dispersed thereon in any of the manners previously employed in the preparation of silver catalysts. If desired, the mixture of the coprecipitate and the freshly prepared reducible silver compounds may be applied to the support and the resulting mixture may either thermally or chemically be reduced in order to present the metallic silver-beryllium oxide mixture on the carrier as an active catalyst.

The amount of silver present in the dispersion of the silver-beryllium oxide containing catalytic material on or in a carrier may be varied, but it will ordinarily be found most economic to use from 30 to 500 grams of silver per liter of total catalyst composition, and still more preferably from 75 to 200 grams of silver per liter of total catalyst composition.

The selection of the particle size of the support or carrier will ordinarily follow the design of a specific process and apparatus. For use in fluid-flow processes for the oxidation of ethylene, for which the catalyst compositions of this invention are particularly well suited, the carrier should have a particle size less than about 35 mesh. After a gas velocity has been selected, the specific particle size can be adjusted so that the catalyst composition can be suspended by the gas stream.

In addition to the catalytic silver-beryllium oxide mixture and the carrier or support, the total catalyst compositions of the invention may include other materials such as the conventional promoters and diluents, and also conditioning agents.

The following examples illustrate catalytic compositions of the invention, methods by which they are prepared and processes for their use.

*Example I*

This example shows the preparation and use of a silver catalyst composition of the invention in which the Ag:Be weight ratio of the coprecipitate is 150:1, and separately prepared silver compound is admixed therewith in amount corresponding to 50 parts by weight of silver for each part by weight of beryllium in the coprecipitate to give a resulting mixture having a Ag:Be weight ratio of 200:1.

A solution of 59.1 g. silver nitrate and 5.2 g. beryllium nitrate trihydrate in one liter of water is mixed with a solution of 17 g. sodium hydroxide in 153 cc. water by rapid addition of the alkali with good stirring. After stirring ten minutes to insure homogeneity, the precipitate which formed is washed five times by allowing to settle, decanting the water, and adding an equal volume of fresh distilled water.

After the final wash, the precipitate suspended in a small amount of remaining water is mixed with a slurry prepared as follows:

19.7 g. silver nitrate is dissolved in 500 cc. water and precipitated with a solution of 5 g. sodium hydroxide in 45 cc. water. This suspension is washed in the same manner as the silver oxide-hydrated beryllium oxide prepared above and then is added to that mixture as indicated.

The resulting slurry is stirred rapidly for 10 minutes in one liter of water and then allowed to settle. The supernatant liquid is decanted and the precipitate is filtered almost to dryness using a vacuum filter. The solids are reslurried four times with 100 cc. pure acetone, then sucked dry as possible on a vacuum filter and then heated for four hours at 65° C. The dried oxide mixture is ground to pass a 48 mesh screen.

20.4 g. of the dried oxide mixture prepared as above is stirred in acetone slurry with 37 g. calcined diatomaceous earth (sized 80–200 mesh) until dry enough to be free flowing. It is then dried in a stream of nitrogen, first at room temperature and then at a temperature of about 175° C. When dried, the resulting supported oxide mixture is reduced by passing a stream of 2% ethylene in nitrogen thru a fixed bed of material at 175° C. to give a supported silver-beryllium oxide composition.

The supported silver-beryllium oxide composition is then heated in air at 400° C. for five hours. After cooling it is then diluted with twice its volume of granular artificial graphite (sized 80–200 mesh) to give a finished catalyst composition.

Using the catalyst composition of this example in a boiling-bed type operation with a feed gas containing 10% ethylene in air, a temperature of 260–280° C., a gas space velocity of 1800 hr.$^{-1}$ and a linear gas velocity of 0.5 ft. per second, 44% of the ethylene reacts, and 61% of the reacted ethylene forms ethylene oxide.

The feature of conditioning silver-containing catalysts with granular artificial graphite, a specific application which is shown in the above example, is claimed in coassigned copending Sears application, Serial No. 100,982, filed June 23, 1949.

*Example II*

In this example the Ag:Be weight ratio in the coprecipitate is 67:1 and the separately prepared silver compound is added thereto in amount corresponding to 33 parts by weight of silver for each part by weight of beryllium in the coprepitate, thus giving a mixture having a Ag:Be weight ratio of 100:1.

A preparation of the composition of this example differs from that of the composition of Example I in the following respects: 52.5 g. silver nitrate and 10.4 g. beryllium nitrate trihydrate are used in the coprecipitation step; and 26.3 g. silver nitrate and 6.5 g. sodium hydroxide are used in separately preparing reducible oxygen-containing silver compound. The heat treatment of the reduced silver-beryllium oxide mixture was carried out at 500° C. for four hours.

Operating an ethylene oxidation process with the catalyst composition of this example at a temperature of 270–290° C. and the remaining conditions as in Example I, 41% of the ethylene reacts and 60% of the reacted ethylene forms ethylene oxide.

*Example III*

A catalyst composition is prepared according to the general process described in Example I except that the amounts of reagents are varied to give a coprecipitate having an Ag:Be weight ratio of 100:1 and this is intimately mixed with a separately prepared silver oxide, the silver oxide being used in amount corresponding to 100 parts by weight of silver for each part by weight of beryllium in the coprecipitate to give a resulting mixture having a Ag:Be weight ratio of 200:1.

Operating the composition of this example in ethylene oxidation process at a temperature of 280–310° C. and other conditions as in Example I, 38% of the ethylene reacts and 59% of the reacted ethylene forms ethylene oxide, as an average, over 35 hours of operation.

*Example IV*

A catalyst composition is prepared in essentially the same manner as Example I except for the following changes.

23.6 g. silver nitrate and 6.2 beryllium nitrate trihydrate are precipitated with 10 g. sodium hydroxide in 90 cc. of water in the coprecipitation step; and 55.2 g. silver nitrate are precipitated with 14 g. sodium hydroxide in 126 cc. of water in making the separate corporation of reducible silver compound. Thus the coprecipitate is formed having a Ag:Be weight ratio of 50:1 and to this there is added a reducible silver compound in amount corresponding to 116 parts by weight of silver for each part of beryllium in the coprecipitate to give a resulting mixture having a Ag:Be weight ratio of 166:1.

The catalyst composition of this example operated in a boiling-bed process at a temperature of 280–300° C. using a feed of 10% ethylene in air at a space velocity of 1800 hr.$^{-1}$ and a linear velocity of 0.5 ft./sec., causes 36% of the ethylene fed to react, and 63% of the reacted ethylene forms ethylene oxide, as an average, over 200 hours of operation.

We claim:

1. A process for preparing a silver-beryllium oxide catalyst adapted to catalyze the oxidation of ethylene to ethylene oxide which comprises coprecipitating a reducible oxygen-containing compound of silver and a corresponding compound of beryllium in a silver:beryllium weight ratio of from 5:1 to 150:1 from a solution of a silver compound and a beryllium compound, intimately mixing said coprecipitate with a separately prepared reducible oxygen-containing compound of silver, said separately prepared silver compound being added in the mixing step in amount corresponding to at least 25 parts by weight of silver for each part by weight of beryllium in the coprecipitate and in amount sufficient to give a resulting mixture in which the Ag:Be weight ratio is in the range of 100:1 to 500:1; then reducing the intimate mixture to a mixture of metallic silver and beryllium oxide and heating the reduced mixture at about 350 to 600° C. for 3 to 10 hours.

2. A catalyst composition adapted to catalyze the oxidation of ethylene to ethylene oxide which comprises as an active catalytic material a silver-beryllium oxide mixture obtained by coprecipitating a reducible oxygen-containing compound of silver and a corresponding compound of beryllium in a silver:beryllium weight ratio of from 5:1 to 150:1 from a solution of a silver compound and a beryllium compound, intimately mixing said coprecipitate with a separately prepared reducible oxygen-containing compound of silver, said separately prepared silver compound being added in the mixing step in amount corresponding to at least 25 parts by weight of silver for each part by weight of beryllium in the coprecipitate and in amount sufficient to give a resulting mixture in which the Ag:Be weight ratio is in the range of 100:1 to 500:1; then reducing the intimate mixture to a mixture of metallic silver and beryllium oxide and heating the reduced mixture at about 350 to 600° C. for 3 to 10 hours.

3. A catalyst composition adapted to catalyze the oxidation of ethylene to ethylene oxide which comprises a divided granular carrier and dispersed thereon as an active catalytic material a silver:beryllium oxide mixture, the silver constituting from 75 to 200 grams per liter of total catalyst composition, and the silver-beryllium oxide mixture being obtained by coprecipitating a reducible oxygen-containing compound of silver and a corresponding compound of beryllium in a silver:beryllium weight ratio of 5:1 to 150:1 from an aqueous solution of the nitrates of said metals, intimately mixing said coprecipitate in liquid suspension with a separately prepared reducible oxygen-containing compound of silver, said separately prepared silver compound being added in the mixing step in amount corresponding to at least 25 parts by weight of silver for each part by weight of beryllium in the coprecipitate and in amount sufficient to give a resulting mixture in which the Ag:Be weight ratio is in the range of 100:1 to 500:1; then reducing the intimate mixture to a mixture of metallic silver and beryllium oxide and then heating the reduced mixture at 400 to 500° C. for 4 to 5 hours.

GEORGE W. SEARS, JR.
WALLACE W. THOMPSON.

REFERENCES CITED

The following references are of record in the file of this patent:

UNITED STATES PATENTS

| Number | Name | Date |
| --- | --- | --- |
| 2,354,892 | Thacker | Aug. 1, 1944 |
| 2,554,459 | Heider | May 22, 1951 |